United States Patent Office 2,999,114
Patented Sept. 5, 1961

---

2,999,114
N(β-TRINITROETHYL)-p-NITROANILINE
Delore L. Kouba, Newport, Del., assignor, by mesne assignments, to the United States of America as represented by the Secretary of the Navy
No Drawing. Filed May 7, 1952, Ser. No. 286,597
1 Claim. (Cl. 260—577)

This invention relates to a new explosive compound N(β-trinitroethyl)-p-nitroaniline.

The new compound of the invention is an orange colored solid which is relatively stable. It possesses utility as an intermediate for the preparation of compounds by nitration which have important explosive properties.

It is an object of the invention to provide a new compound, N(β-trinitroethyl)-p-nitroaniline.

The new compound is prepared by the condensation of p-nitroaniline and trinitroethanol.

The invention is illustrated by the following example, but is not limited thereto.

Example

Trinitroethanol and p-nitroaniline, in the ratio of 2 moles to 1 respectively, were heated to 50° C. (fusing temperature, 40° C.). The reaction product was cooled and washed with water. Recrystallization from methanol-water produced an orange colored product.

The compound has the following formula:

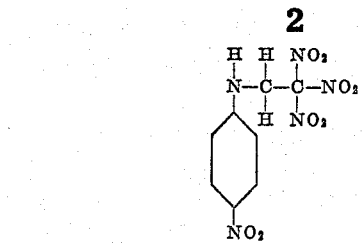

The percent of nitrogen calculated for $C_8H_7N_5O_8$ is 23.2. Analysis of the compound gave 23.2 percent nitrogen.

The compound has a melting point of 120° C. It was found to be relatively stable, giving a time of 4½ minutes with the potassium-iodide stability test. It is only slightly sensitive to impact having a sensitivity to impact in the range of that of TNT.

What is claimed is:
N(β-trinitroethyl)-p-nitroaniline having the following structural formula:

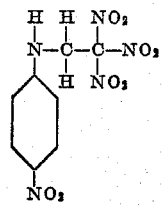

References Cited in the file of this patent
UNITED STATES PATENTS
2,292,212    Dickey et al. _____ Aug. 4, 1942